(No Model.)
J. W. CAHOW.
HARVESTER REEL DRIVER.
No. 461,813.  Patented Oct. 27, 1891.
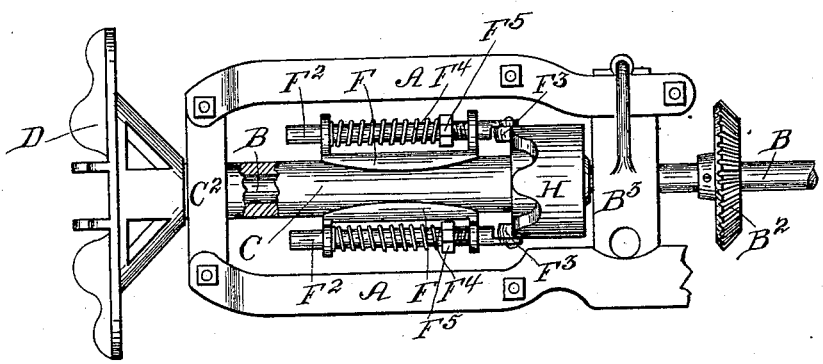
Witnesses:
M. P. Smith.
C. C. Bulkley.
Inventor:
James W. Cahow,
By Thomas G. Orwig, Atty.

UNITED STATES PATENT OFFICE.

JAMES W. CAHOW, OF LEXINGTON, NEBRASKA.

HARVESTER-REEL DRIVER.

SPECIFICATION forming part of Letters Patent No. 461,813, dated October 27, 1891.

Application filed November 21, 1890. Serial No. 372,128. (No model.)

*To all whom it may concern:*

Be it known that I, JAMES W. CAHOW, a citizen of the United States of America, and a resident of Lexington, in the county of Dawson and State of Nebraska, have invented an Improved Harvester-Reel Driver, of which the following is a specification.

The object of my invention is to provide improved means for dislocating the reel-driving mechanism of a harvester to prevent said reel from being broken by forcible contact with an obstruction.

My invention consists in the construction of a reel-driver comprising a driving-shaft geared to the traction mechanism of a harvester, a clutch-disk rigidly fixed to said driving-shaft, a reel-head rigidly fixed to a sleeve adapted to rotate in conjunction with or independently of the said driving-shaft, sliding bolts mounted in bearings fixed to the said sleeve, said bolts having rollers fixed to one of their ends engaging the clutch-disk and held in contact therewith by springs mounted on said bolts, and means for regulating the pressure of said springs, as hereinafter described.

A represents a frame adapted to be attached to a harvester to support the devices about to be described.

B represents a driving-shaft adapted to be driven by the traction mechanism of a harvester by bevel-pinions $B^2$. This shaft is passed through and supported by a bearing $B^3$, formed in the frame A. This driving-shaft B also extends full length of the frame A and has a rotating sleeve C mounted thereon, which sleeve is also supported in a bearing $C^2$, formed in the frame A.

D represents a reel-head of common form, to which a reel may be attached, and is rigidly fixed to the outer end of the sleeve C and rotated thereby.

F represents bearings fixed to the sleeve C longitudinally of said sleeve, which bearings are adapted to support sliding bolts $F^2$ to slide therein. These sliding bolts $F^2$ have rollers $F^3$ pivoted to the ends thereof nearest to the harvester, which rollers are adapted to rotate in the longitudinal plane of the sliding bolts. These bolts are also provided with spiral springs $F^4$, mounted thereon, one end of each of which springs impinges against one portion of the bearings F and the other end of each spring confined in any desired position by a nut $F^5$, which nut is adapted to travel upon a screw-thread formed on the body portion of the aforesaid bolts.

H represents a disk rigidly fixed to the driving-shaft B, and has a series of concaved notches in one of its sides to form a clutch-face, which notches correspond in size and shape with a portion of the periphery of the rollers $F^3$.

In the practical use of my invention, when the reel comes in contact with any obstruction the springs F are compressed by the rollers $F^3$ being obliged to ride upon and over the projections in the side of the wheel H, thus disengaging the rollers and wheel and allowing the reel to remain stationary until the obstruction be removed or the harvester stopped.

I claim as my invention—

1. A harvester-reel driver comprising a shaft geared to the traction mechanism of a harvester, a clutch-disk fixed to said shaft, a sleeve carrying the reel-head mounted upon said shaft, spring-actuated sliding bolts mounted in bearings fixed to said sleeve, friction-rollers pivoted on said bolts and engaging with said clutch-disk, as shown and described.

2. A harvester-reel driver comprising a reel-carrying sleeve and a driven shaft mounted in a suitable frame secured to the harvester and connected by means of a sliding bolt mounted in bearings on the sleeve and having a friction-roller pivoted thereon which is normally held in engagement with a clutch-disk on the shaft by yielding pressure, and a tension-regulator to vary the strength of said yielding pressure, as shown and described, to operate in the manner set forth, for the purposes stated.

3. The combination, with a driven shaft having a clutch-disk mounted rigidly thereon, of a sleeve carrying the reel-head and having sliding bolts mounted thereon, which bolts have friction-rollers pivoted thereon and normally held in contact with the disk by yielding pressure, as set forth.

JAMES W. CAHOW.

Witnesses:
 GEO. LITTLE, Jr.,
 J. W. RADCLIFF.